United States Patent
Nagatsuka et al.

(10) Patent No.: US 12,469,117 B2
(45) Date of Patent: Nov. 11, 2025

(54) DYNAMIC IMAGING QUALITY CONTROL DEVICE, STORAGE MEDIUM AND DYNAMIC IMAGING QUALITY CONTROL METHOD

(71) Applicant: Konica Minolta, Inc., Tokyo (JP)

(72) Inventors: Sumiya Nagatsuka, Hino (JP); Koutarou Kanamori, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 411 days.

(21) Appl. No.: 17/729,527

(22) Filed: Apr. 26, 2022

(65) Prior Publication Data

US 2022/0351358 A1     Nov. 3, 2022

(30) Foreign Application Priority Data

Apr. 28, 2021  (JP) ................. 2021-076006
Jun. 15, 2021  (JP) ................. 2021-099249

(51) Int. Cl.
*G06T 7/00*     (2017.01)
*A61B 6/00*     (2006.01)
*A61B 6/46*     (2024.01)
*A61B 6/58*     (2024.01)

(52) U.S. Cl.
CPC ............ *G06T 7/0002* (2013.01); *A61B 6/463* (2013.01); *A61B 6/465* (2013.01); *A61B 6/5211* (2013.01); *A61B 6/583* (2013.01); *G06T 2207/30168* (2013.01)

(58) Field of Classification Search
None
See application file for complete search history.

(56) References Cited

U.S. PATENT DOCUMENTS

2004/0167395 A1* 8/2004 Behrenbruch ............ G06T 7/30
                                                          600/431
2007/0009096 A1*  1/2007 Cresens ................ A61B 6/583
                                                          378/207

FOREIGN PATENT DOCUMENTS

| JP | 2008283531 A | 11/2008 |
| JP | 2014023640 A | 2/2014 |
| JP | 2018129738 A | 8/2018 |
| JP | 2020036694 A | 3/2020 |
| JP | 2020081185 A | 6/2020 |
| JP | 2020089399   | 6/2020 |
| JP | 2020089399 A | 6/2020 |
| JP | 6870765 B1   | 4/2021 |

OTHER PUBLICATIONS

Haraguchi et al., "Simple Check QC", Konica Minolta Technology Report vol. 6 (2009) pp. 69-72 with partial English translation.
(Continued)

*Primary Examiner* — Leon Flores
(74) *Attorney, Agent, or Firm* — CANTOR COLBURN LLP

(57) ABSTRACT

A dynamic imaging quality control device performs quality control of dynamic imaging in which a dynamic state of a subject is imaged by irradiating the subject with radiation. The device includes a hardware processor that generates quality information regarding a quality of the dynamic imaging by using at least two frame images among multiple frame images constituting a dynamic image obtained by the dynamic imaging and outputs the quality information.

26 Claims, 7 Drawing Sheets

(56) References Cited

OTHER PUBLICATIONS

JPO Notice of Reasons for Refusal for corresponding JP Application No. 2021-099249; Dated Jan. 28, 2025.
JPO Notification of Reasons for Refusal for corresponding JP Application No. 2021-076006; Issued Oct. 15, 2024.
JPO Notice of Reasons for Refusal for corresponding JP Application No. 2021-076006; Issued Apr. 22, 2025.
JPO Decision of Refusal for corresponding JP Application No. 2021-099249; Issued Jul. 1, 2025.
SIPO First Office Action for corresponding CN Application No. 202210469630.8; dated Jun. 29, 2025.
JPO Decision of Refusal for corresponding JP Application No. 2021-076006; issued Sep. 30, 2025.

\* cited by examiner

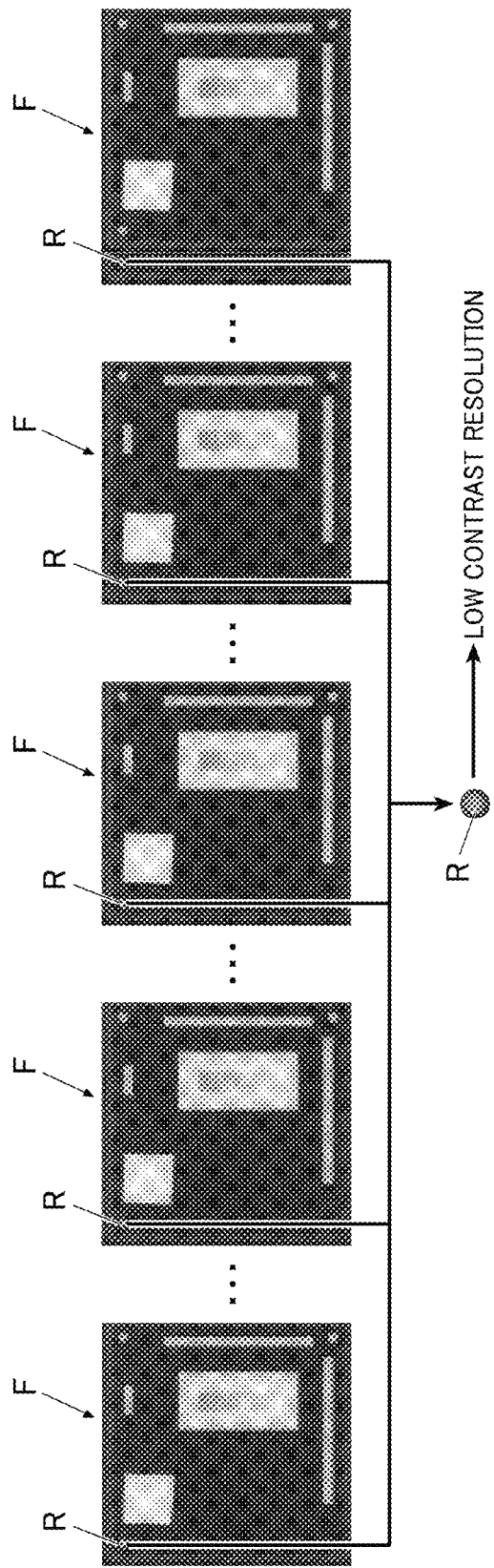

DYNAMIC IMAGING QUALITY CONTROL DEVICE, STORAGE MEDIUM AND DYNAMIC IMAGING QUALITY CONTROL METHOD

CROSS-REFERENCE TO RELATED APPLICATIONS

The present invention claims priority under 35 U.S.C. § 119 to Japanese Patent Application No. 2021-076006 filed on Apr. 28, 2021, and Japanese Patent Application No. 2021-099249 filed on Jun. 15, 2021, the entire content of which is incorporated herein by reference.

TECHNICAL FIELD

The present disclosure relates to a dynamic imaging quality control device, a storage medium, and a dynamic imaging quality control method.

BACKGROUND

Various techniques have been proposed for carrying out quality control (QC) and quality assurance (QA) of still image radiography.

For example, JP2008-283531A discloses a radiographic image reading system that performs arithmetic processing with image data obtained by radiographing a QC phantom. Through the processing, the system evaluates accuracy of displayed dimension, linearity, clarity, and so forth to determine whether the evaluation results of these evaluation items exceed their respective thresholds. On the basis of the determination, the system determines whether the respective evaluation items are "PASS" or "FAIL".

Further, "The Simple Check QC: Quality Control Program for Computed Radiography", Tsuyoshi Haraguchi et al, KONICA MINOLTA TECHNOLOGY REPORT Vol. 6, pp. 69-72, 2009, discloses a QC program. According to the program, a QC phantom is imaged; all examination items including detector response are analyzed by automatic computing; decisions are made whether the computed values are within a control range; and a user is notified of the judgement result.

SUMMARY

Recently, various devices have been developed for performing dynamic imaging, in which a subject is continuously irradiated with radiation to obtain a dynamic image consisting of multiple frame images.

Like still imaging, it is preferable that dynamic imaging maintain a certain quality level to prevent problems such as misdiagnosis by doctors, increased burdens on radiologists, and retaking of images that leads to an increase in exposure dose of patients. However, QC and QA of dynamic imaging, which is rather a new technology in medical fields, has not been fully researched and developed.

For example, periodic QC after the delivery of an imaging device is often done manually and individually by radiologists. As the information regarding QC of dynamic imaging ranges widely as compared with that of still imaging, QC of dynamic imaging requires improvement in its operational efficiency.

Dynamic imaging consecutively obtains multiple frame images, whereas still imaging obtains only a single frame image. Dynamic imaging therefore requires longer irradiation time, which may lead to insufficient cooling of a radiation source. The unreleased heat may increase the temperature of the radiation source.

As the temperature of the radiation source increases, the radiation dose emitted by the radiation source increases/decreases (changes) with the passage of time. As a result, the pixel values read by the radiation detector on the basis of the radiation dose increase/decrease.

In one time of dynamic imaging, multiple frame images are obtained. To reduce the exposure dose of an examinee, the dose per frame in dynamic imaging is lower than that in still imaging. When the dose of radiation passing through the examiner is low, pixel values read by the radiation detector may contain relatively large noise. Such noise is allowed to some extent as a trade-off for the reduction of the exposure dose.

Even if a dynamic image includes noise that would not be desirable for still image diagnosis (diagnoses using a single frame image), such a dynamic image is usable for diagnosis as long as it retains such a quality that allows dynamic analysis or observation of the dynamic state.

Thus, QC/QA of dynamic imaging and still imaging needs to be done in different points of view (QC and QA of still imaging is not sufficient for dynamic imaging).

The present invention has been conceived in view of the above issues. An object of the present invention is to appropriately perform quality control of dynamic imaging in which multiple frame images are obtained.

To achieve the above object, according to an aspect of the present invention, there is provided a dynamic imaging quality control device that performs quality control of dynamic imaging in which a dynamic state of a subject is imaged by irradiating the subject with radiation, the device including a hardware processor that
    generates quality information regarding a quality of the dynamic imaging by using at least two frame images among multiple frame images constituting a dynamic image obtained by the dynamic imaging and
    outputs the quality information.

According to an aspect of the present invention, there is provided a non-transitory computer-readable storage medium storing a dynamic imaging quality control program for performing quality control of dynamic imaging in which a dynamic state of a subject is imaged by irradiating the subject with radiation, the program causing a computer to:
    generate quality information regarding a quality of the dynamic imaging by using at least two frame images among multiple frame images constituting a dynamic image obtained by the dynamic imaging, and
    output the quality information.

According to another aspect of the present invention, there is provided a dynamic imaging quality control method for performing quality control of dynamic imaging in which a dynamic state of a subject is imaged by irradiating the subject with radiation, the method including:
    generating quality information regarding a quality of the dynamic imaging by using at least two frame images among multiple frame images constituting a dynamic image obtained by the dynamic imaging, and
    outputting the quality information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 8 shows another example of the operation performed by the dynamic imaging QC device in the dynamic imaging QC process shown in FIG. 6.

DETAILED DESCRIPTION OF THE EMBODIMENTS

Hereinafter, one or more embodiments of the present invention will be described with reference to the drawings. The scope of the present invention is not limited to the following embodiment or illustrated examples.

1. Radiographic Imaging System

The schematic configuration of a radiographic imaging system (hereinafter, system 100) according to an embodiment is described.

Figure 1:
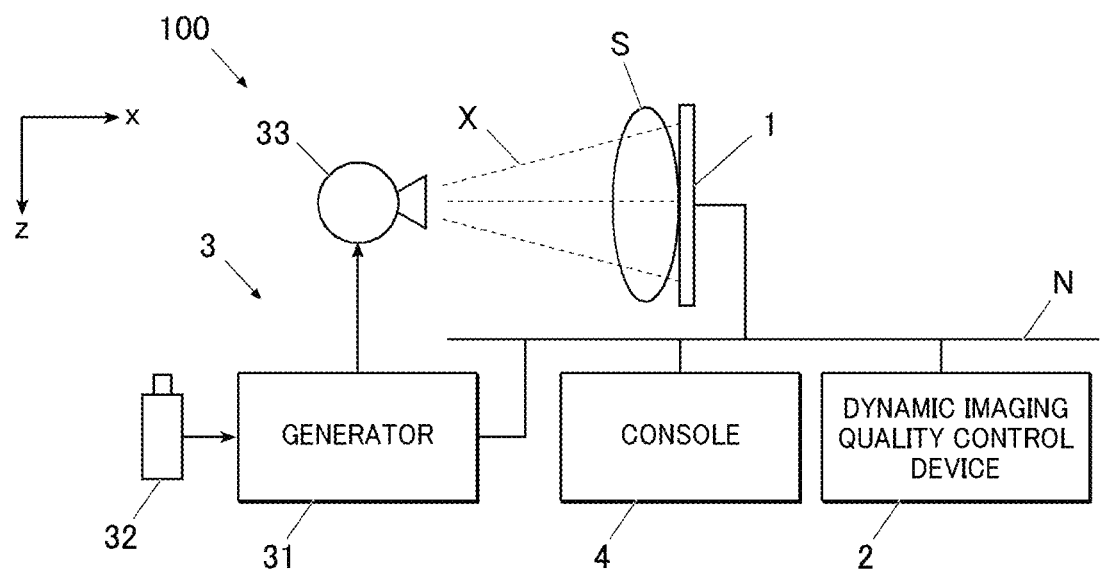
FIG. 1 is a block diagram showing an example of a radiographic imaging system according to an embodiment of the present invention.
Figure 2:
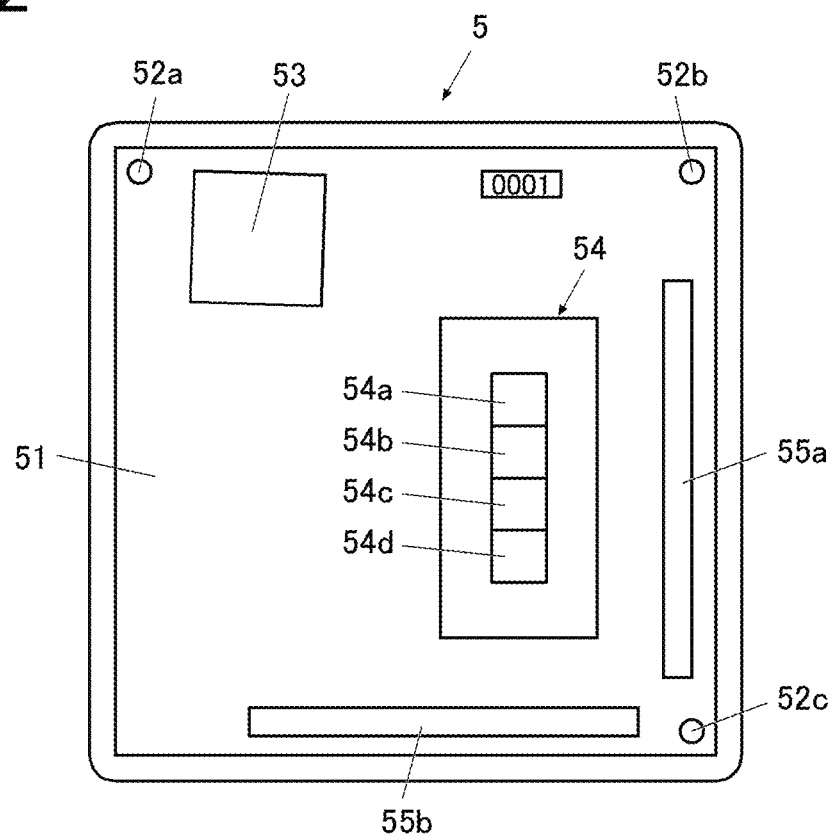
FIG. 2 is a transparent plan view showing the interior of an example QC phantom that is used for QC of the radiographic imaging system shown in FIG. 1.
Figure 3A:
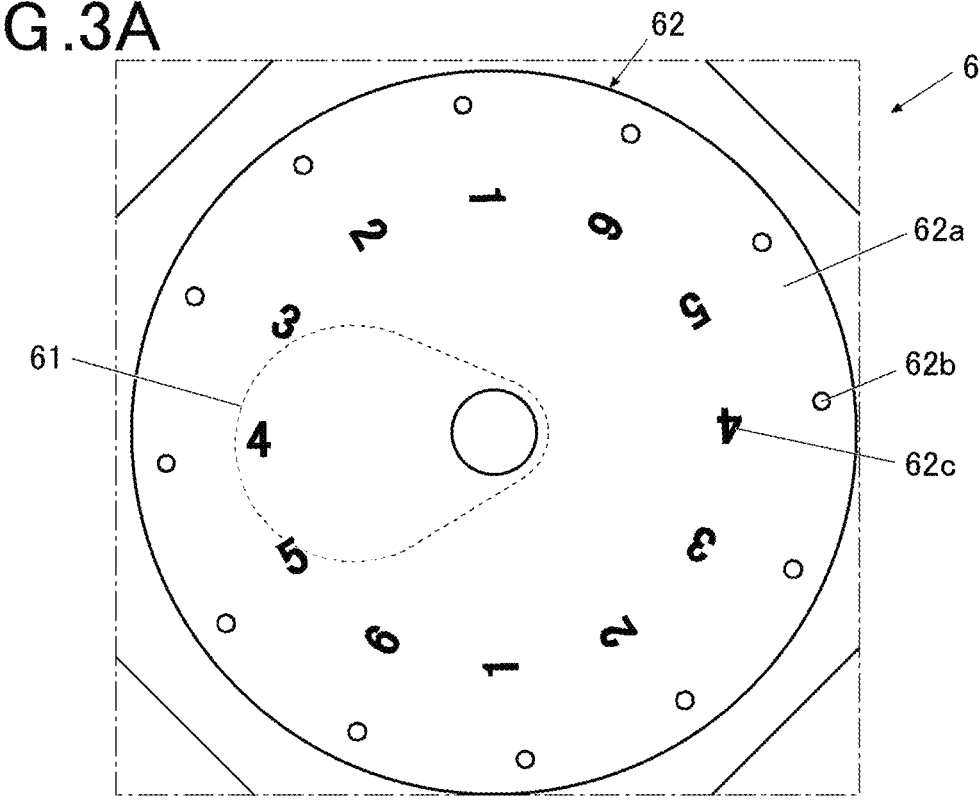
FIG. 3A is a plan view of an example QC dynamic phantom that is used for QC of the radiographic imaging system shown in FIG. 1.

FIG. 1 shows a block diagram of an example of the system 100. FIG. 2 shows a transparent plan view showing the interior of an example QC phantom that is used for QC of the system 100. FIG. 3A is a plan view of an example QC dynamic phantom that is used for QC of the system 100.

The system 100 includes a radiation detector (hereinafter, detector 1) and a dynamic imaging QC device (hereinafter, QC device 2), as shown in FIG. 1.

The system 100 according to this embodiment also includes a radiation generation device 3 and a console 4.

The devices 1 to 4 can communicate with each other via a communication network N (e.g., local area network (LAN), wide area network (WAN), the internet), for example.

The system 100 may also communicate with a not-illustrated hospital information system (HIS), radiology information system (RIS), picture archiving and communication system (PACS), and dynamic analysis devices.

[1-1. Radiation Generation Device]

The radiation generation device 3 includes a generator 31, an irradiation instruction switch 32, and a radiation source 33.

The radiation generation device 3 may be installed in a radiography room, or the radiation generation device 3 and the console 4 may constitute a movable device called a mobile medical vehicle.

The generator 31 applies a voltage corresponding to predetermined imaging conditions to the radiation source 33 (tube) in response to the irradiation instruction switch 32 being manipulated. The imaging conditions include: conditions concerning a subject S, such as the imaging region, imaging direction, and physique of the subject S; and conditions concerning irradiation of radiation X, such as tube voltage, tube current, irradiation time, current-time product (mAs value), for example.

When the generator 31 applies a voltage to the radiation source 33, the radiation source 33 generates radiation X (e.g., X-rays) with a dose corresponding to the applied voltage.

The radiation source 33 is movable in the X-axis direction (emitting direction of radiation X, right-left direction in FIG. 1), Y-axis direction (orthogonal to the X-axis direction, i.e., orthogonal to the sheet surface of FIG. 1), and Z-axis direction (orthogonal to the X-axis and Y-axis directions, i.e., top-bottom direction in FIG. 1). The radiation source 33 is also rotatable on rotation axes parallel to the Y axis and Z axis, respectively, to change the direction of the irradiation opening.

The generation device 3 generates such radiation X that corresponds to the type of radiographic image (still image or dynamic image consisting of multiple frame images) to be generated.

In generating a still image, the generation device 3 emits radiation X only once in response to the irradiation instruction switch 32 being pressed once.

In generating a dynamic image, in response to the irradiation instruction switch 32 being pressed once, the generation device 3 repeats emission of pulse radiation X multiple times per predetermined period of time (e.g., 15 times per second) or continues emission of the radiation X for a predetermined period of time.

In the present disclosure, "continuously emit radiation" includes continuous emission in which radiation is continuously emitted, and pulse emission in which radiation is intermittently emitted.

[1-2. Radiation Detector]

The detector 1 includes a sensor substrate, a scanning circuit, a reading circuit (hereinafter, reading out integrated circuit: ROIC), a controlling part, and a communication part, which are not illustrated. The sensor substrate includes radiation detecting elements and switch elements that are arranged two-dimensionally (in a matrix). The radiation detecting elements generate electric charges corresponding to the dose of the received radiation X. The switch elements accumulate and discharge the electric charges. The scanning circuit switches on and off each switch element. The ROIC reads the amount of electric charges discharged from the respective pixels as pixel values. The controlling part generates a radiographic image from the pixel values read by the ROIC. The communication part sends data of the generated radiographic image, various signals, and so forth to the outside and receives various kinds of information and signals.

The detector 1 accumulates/discharges the electric charges and reads signal values in synchronization with irradiation by the generation device 3. The detector 1 thus generates a radiographic image corresponding to the dose of the emitted radiation X.

In generating a still image, the detector 1 generates a radiographic image only once in response to the irradiation instruction switch 32 being pressed once.

In generating a dynamic image, the detector 1 generates a frame image constituting the dynamic image multiple times per a predetermined period of time (e.g., 15 times per second) in response to the irradiation instruction switch 32 being pressed once.

The detector 1 may store and transfer the generated dynamic image in the form of image data or may display the dynamic image in real time on a display connected to the detector 1.

For example, in fluoroscopy, images are displayed in real-time.

[1-3. Console]

The console 4 sets various imaging conditions (tube voltage, tube current, irradiation time (milliampere-second value), imaging region, imaging direction, etc.) in at least either the detector 1 or the radiation generation device 3.

The console 4 may be a personal computer (PC) or a dedicated device.

The console 4 sets the imaging conditions on the basis of imaging order information obtained from other system(s) (HIS, RIS, etc.) or according to operation of a user (e.g., radiologist).

[1-4. Dynamic Imaging QC Device]

The QC device 2 performs quality control of dynamic imaging.

"Dynamic imaging" refers to taking images of the dynamic state of the subject S by continuously irradiating the subject S with radiation.

"Dynamic imaging" includes taking a moving image but does not include taking a still image while displaying a moving image.

"Dynamic image" includes a moving image but does not include an image obtained by taking a still image while displaying a moving image.

The target of quality control by the QC device 2 is at least part of a series of operations (execution of a program) of the system 100 in dynamic imaging. Specifically, the target of quality control is at least one of the following operations: emission of radiation X by the radiation generation device 3; generation of a dynamic image by the detector 1; transfer of the dynamic image between the devices; analysis by a dynamic analysis device; and storage of the dynamic image in a data storage (a cloud server, PACS, etc.).

Quality control (QC) includes not only the quality control by periodic quality checks after the device is delivered but also the quality assurance at the time the device is delivered.

The QC device 2 may be a PC or a dedicated device.

Although the QC device 2 and the console 4 are separately provided in the system 100 in FIG. 1, the QC device 2 may be integrated with the console 4.

When the system 100 includes a not-illustrated dynamic analysis device or a PACS, these devices may be integrated with the QC device 2.

The QC device 2 is described later in detail.

[1-5. Qc Phantom]

In quality control by the QC device 2, a QC phantom (hereinafter, phantom 5) may be used. That is, the phantom 5 may be the subject S of the system 100.

As exemplified in FIG. 2, the phantom 5 in this embodiment includes a radiolucent rectangular board 51 (e.g., acrylic board), multiple kinds of evaluation members arranged on the board 51, and a not-illustrated radiolucent sealing board (e.g., acrylic board) that seals the evaluation members, for example.

The multiple kinds of evaluation members according to this embodiment are metal discs 52a to 52c, an edge pattern 53, a step wedge 54, and jitters 55a, 55b.

The metal discs 52a to 52c each consist of a round metal plate.

The metal that forms the metal discs 52a to 52c includes copper, for example.

The metal discs 52a to 52c are positioned at the three corners of the board 51.

The edge pattern 53 consists of a metal plate that has sharp edges.

The metal that forms the edge pattern 53 includes tungsten, for example.

The edges of the edge pattern 53 are slightly angled with respect to a side of the board 51.

The step wedge 54 includes multiple (e.g., four) rectangular metal plates 54a to 54d that have different thicknesses.

The metal that forms the metal plates 54a to 54d includes copper, for example. The metal plates 54a to 54d are arranged such that the thickness gradually increases or decreases.

The jitters 55a, 55b each consist of a rectangular metal (e.g., copper) plate that has linear edge parts.

A long side of the jitter 55a extends along one side of the board 51, and a long side of the jitter 55b extends along a different side of the board 51 that is orthogonal to the one side.

Although the phantom 5 herein has four kinds of evaluation members, the phantom 5 may have less than or more than four kinds of evaluation members.

Further, although one phantom 5 is used for quality control, multiple phantoms on which different evaluation members are arranged may be used for quality control.

Further, in the above QC using the QC device 2, a dynamic phantom 6 for quality control that moves in a predetermined motion (e.g., rotation or reciprocation) may be used as well as the phantom 5, which does not move. That is, the dynamic phantom 6 may be the subject S of the system 100.

As shown in FIG. 3A, the dynamic phantom 6 in this embodiment includes a power 61 and a movable part 62 that is moved in a specific motion by the power 61.

The movable part 62 according to this embodiment includes a radiolucent disc 62a (e.g., acrylic board), metal discs 62b, and character plates 62c.

The metal discs 62b each consist of a round metal plate.

The metal that forms the metal discs 62b includes copper, for example.

The metal discs 62b are arranged along the contour at the end part of the disc 62a at regular intervals.

The character plates 62c each consist of a metal plate in the shape of a number (e.g., 1 to 6). The number of character plates 62c is equal to the number of metal discs 62b.

The metal that forms the character plates 62c includes copper, for example.

The character plates 62c are arranged closer to the center than the end part of the disc 62a at regular intervals such that the character plates 62c correspond to the metal discs 62b.

Although the movable part 62 of the dynamic phantom 6 exemplified herein is rotatable, the movable part 62 may be reciprocated.

The character plates 62c may be in the shape of alphabets or other characters.

[1-6. Operation of Radiographic Imaging System]

The system 100 configured as described above operates as follows.

First, the subject S (diagnosis target region of the subject) is positioned between the radiation source 33 of the generation device 3 and the detector 1 that are arranged to face each other with a space inbetween. The generation device 3 irradiates the subject S with the radiation X. The detector 1 generates a radiographic image (still image or dynamic image) that shows the diagnosis target region and sends data of the image to at least one of the QC device 2 and the console 4.

In performing quality control, the radiation generation device 3 irradiates the phantom 5/6 positioned between the radiation source 33 and the detector 1. The detector 1 generates an image for quality control (either still image or dynamic image, hereinafter a QC image) and sends the QC image data to the QC device 2.

When receiving the QC image data, the QC device 2 performs a dynamic imaging QC process (described later in detail) and outputs dynamic imaging quality information (described later in detail).

One idea is that the still imaging QC is applied to dynamic imaging. For example, dynamic imaging QC may target an average image that is obtained by averaging multiple frame images constituting a dynamic image.

Such QC, however, may not correctly evaluate low contrast resolution (ability to differentiate objects with different levels of radiation absorption), which is one of evaluation items in quality control, for example.

Specifically, in consideration of safety, low contrast resolution should be evaluated on the basis of the minimum value but not on the average value. However, when multiple frame images are averaged, noise components are also averaged, and the minimum value cannot be obtained.

Figure 3B:
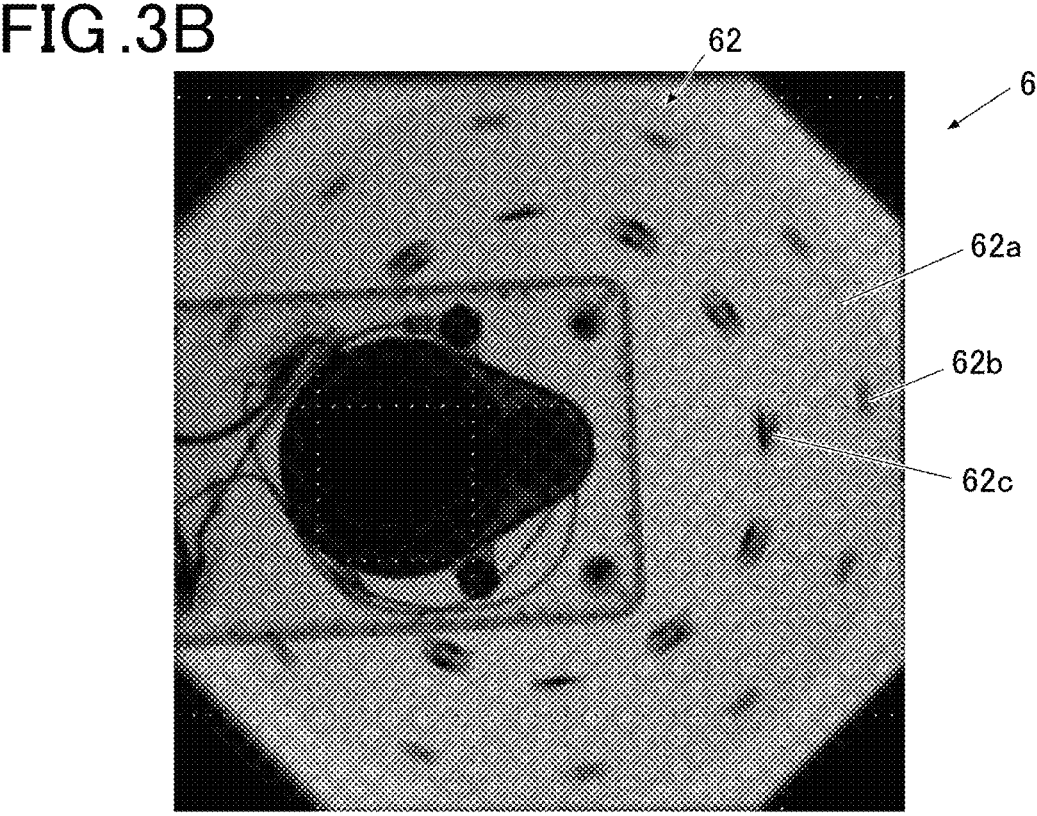
FIG. 3B is an example of an average image of images obtained by dynamically imaging the QC dynamic phantom that is used for QC of the radiographic imaging system shown in FIG. 1.

When images obtained by dynamically imaging a dynamic phantom are used for QC, the average image contains image lag of metal discs 62b and character plates 62c arranged on a movable member 62 of the dynamic phantom 6, as shown in FIG. 3B. Such image lag may prevent accurate evaluations.

This embodiment is also aimed at appropriately performing quality control of dynamic imaging, in which multiple frame images are obtained, on the basis of the respective evaluation items of quality control.

2. Details of Dynamic Imaging QC Device

Next, the QC device 2 of the system 100 is described in detail.

Figure 4:
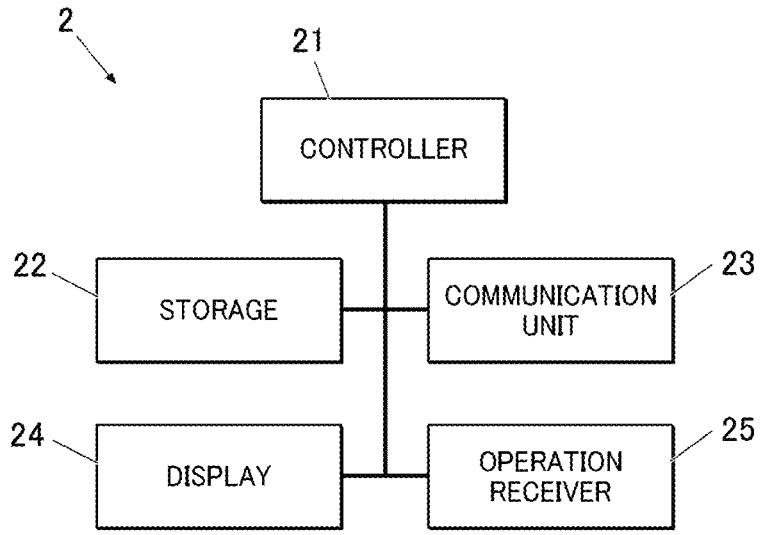
FIG. 4 is a block diagram showing a dynamic imaging QC device included in the radiographic imaging system shown in FIG. 1.
Figure 5:
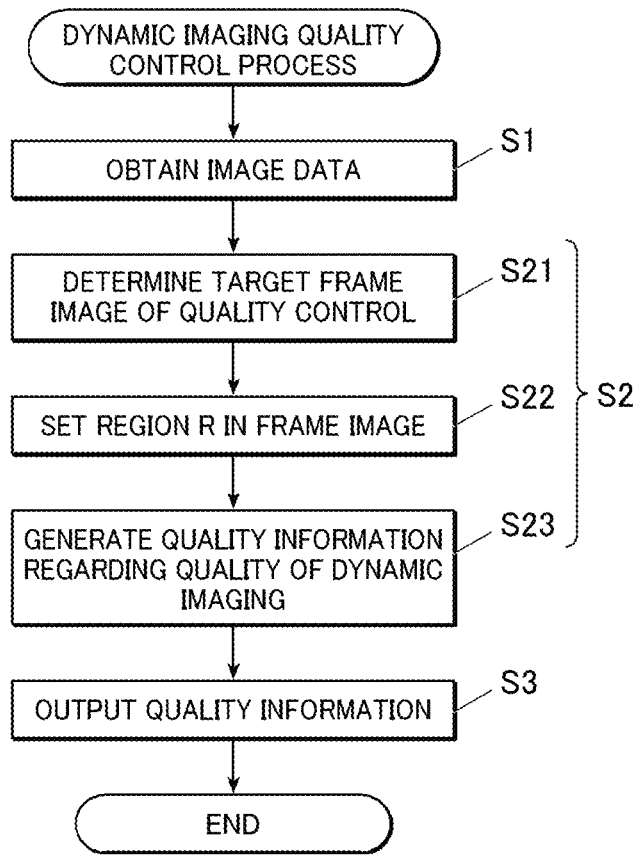
FIG. 5 is a flowchart showing the flow of a dynamic imaging QC process to be performed by the dynamic imaging QC device shown in FIG. 4.
Figure 6:
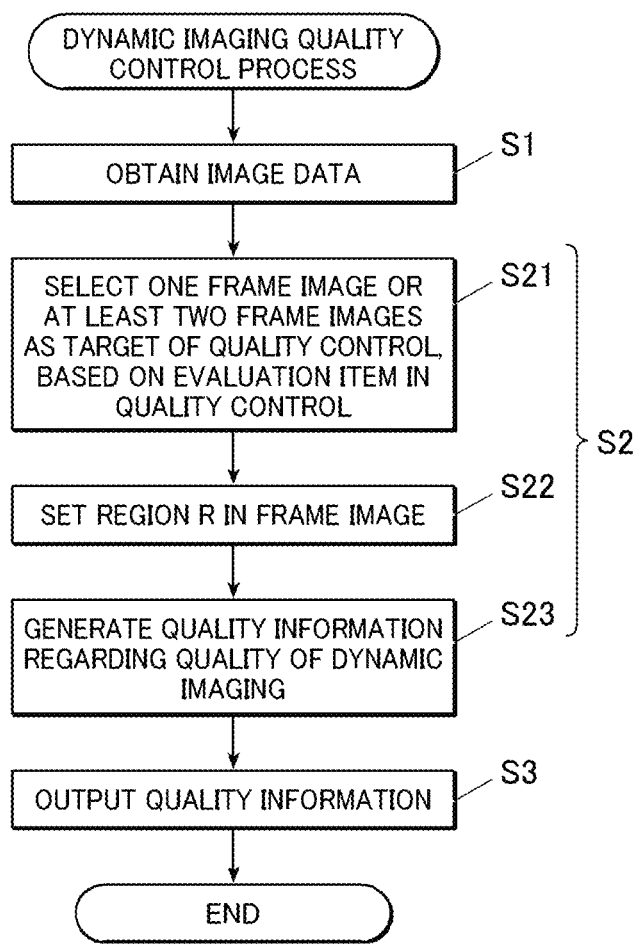
FIG. 6 is a flowchart showing the flow of a dynamic imaging QC process to be performed by the dynamic imaging QC device shown in FIG. 4.
Figure 7A:
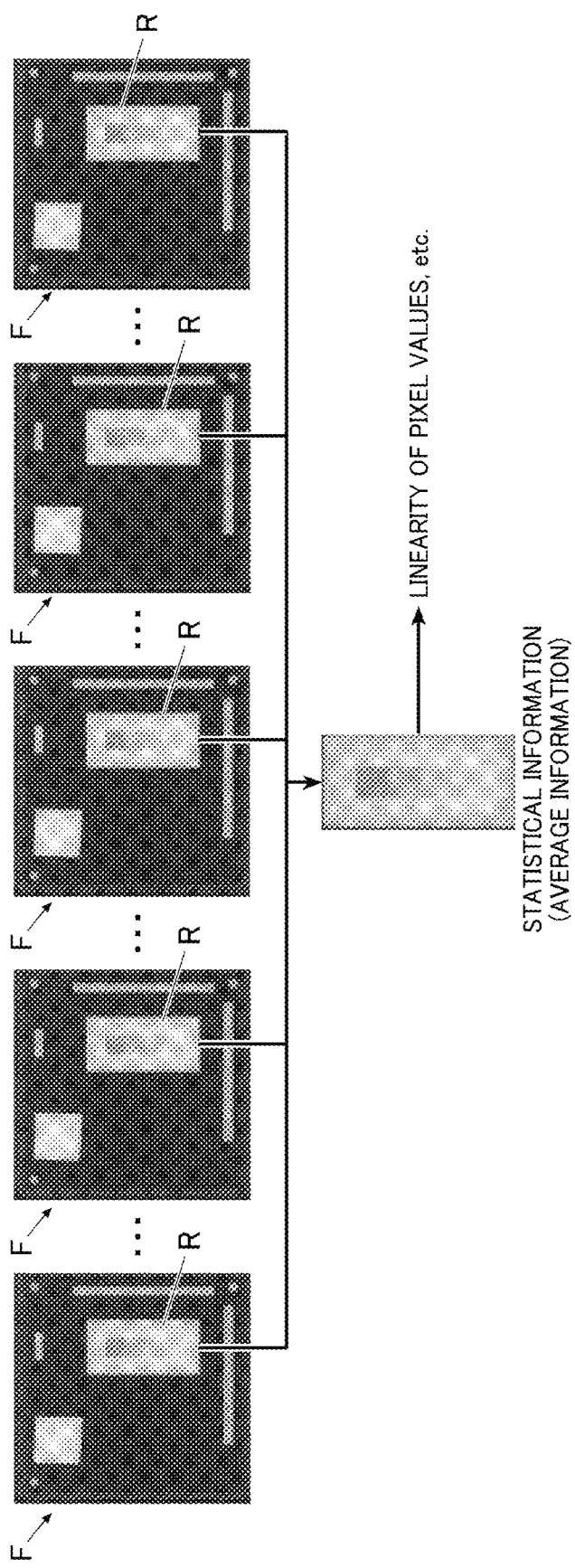
FIG. 7A is a schematic diagram showing an example of operation performed by the dynamic imaging QC device in the dynamic imaging QC process shown in FIG. 5 and FIG. 6.
Figure 7B:
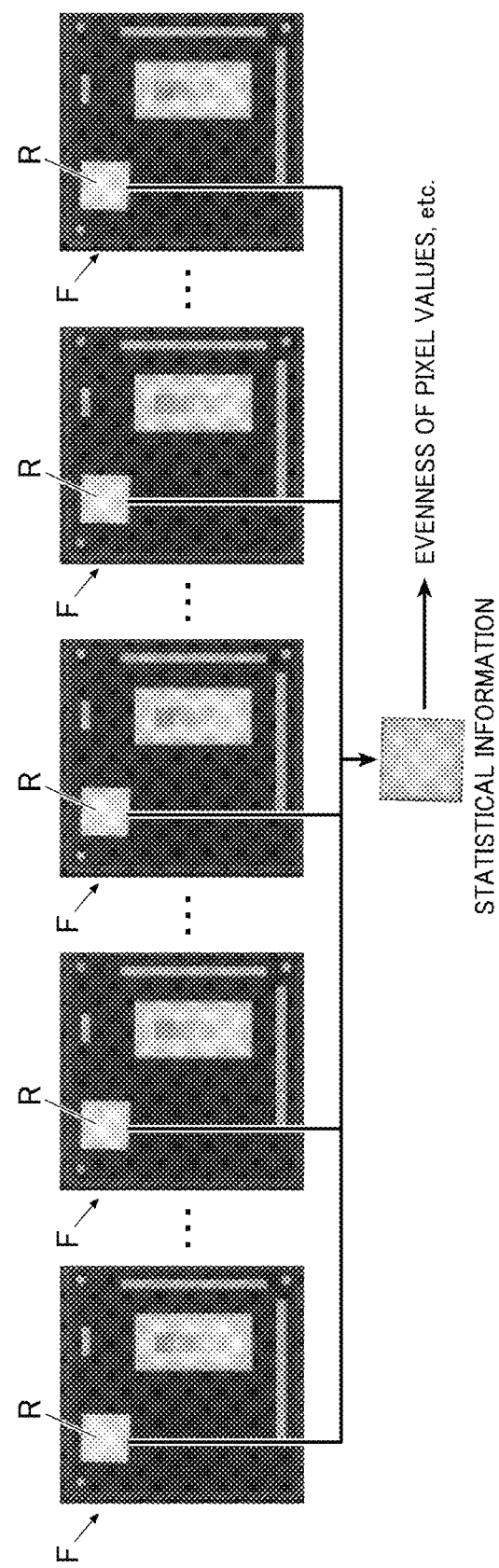
FIG. 7B is a schematic diagram showing an example of operation performed by the dynamic imaging QC device in the dynamic imaging QC process shown in FIG. 5 and FIG. 6.

FIG. 4 is a block diagram of the QC device 2. FIG. 5 and FIG. 6 each show a flowchart of the dynamic imaging QC process to be performed by the QC device 2. FIG. 7A and FIG. 7B are schematic diagrams showing operations of the QC device 2 in the dynamic imaging QC process.

[2-1. Configuration of Dynamic Imaging QC Device]

As shown in FIG. 4, the QC device 2 includes a controller 21 (hardware processor, generation unit, output unit), a storage 22, a communication unit 23, a display 24, and an operation receiver 25 (receiver).

These parts 21-25 are electrically connected via a bus, for example.

The controller 21 includes a central processing unit (CPU) and a random access memory (RAM), for example.

The CPU of the controller 21 reads various programs stored in the storage 22, loads the programs into the RAM, and performs various processes in accordance with the loaded programs. The CPU of the controller 21 thus centrally controls operations of the components of the QC device 2.

The storage 22 includes a nonvolatile memory or a hard disk, for example.

The storage 22 stores various programs including the dynamic imaging QC program to be executed by the controller 21 and parameters necessary for executing the programs.

The storage 22 may be able to store image data of radiographic images obtained from other devices.

The communication unit 23 includes a communication module.

The communication unit 23 sends and receives various kinds of signals and data to and from other devices (e.g., detector 1, console 4) wirelessly or through wires over the communication network N (e.g., local area network (LAN), wide area network (WAN), the internet).

The display 24 displays various contents for diagnosis by the user.

The display 24 includes a liquid crystal display (LCD), an electronic luminescent display (ELD), or a cathode ray tube (CRT), for example.

The display 24 displays radiographic images corresponding to image signals received from the controller 21.

The operation receiver 25 is an operation tool operable by the user.

The operation receiver 25 includes a keyboard having cursor keys, number keys, and various function keys, a pointing device such as a mouse, and a touchscreen layered on the surface of the display 24.

The operation receiver 25 outputs control signals corresponding to the user's operation to the controller 21.

The QC device 2 may not include the display 24 and the operation receiver 25. For example, the QC device 2 may receive control signals from an input device separate from the QC device 2 and output image signals to a display (monitor) separate from the QC device 2 via the communication unit 23.

When any other device (e.g., console 4) includes a display and an operation receiver, the QC device 2 may receive control signals from the operation receiver of the other device and output image signals to the display of the other device. That is, the display and operation receiver may be shared among the devices.

[2-2. Operation of Dynamic Imaging QC Device]

The controller 21 of the QC device 2 configured as described above performs the dynamic imaging QC process exemplified in FIG. 5 and FIG. 6 when a predetermined condition is met.

Examples of the predetermined condition include: the QC device 2 being turned on; image data being obtained from any of other devices; control signals being received from other devices; and a predetermined operation being made with the operation receiver 25 (e.g., operation to start the dynamic imaging QC process, operation to select the QC check).

[Obtainment of Image Data]

In the dynamic imaging QC process, the controller 21 firstly performs an obtainment step (Step S1 in FIG. 5 and FIG. 6).

In the obtainment step, the controller 21 obtains image data corresponding to the contents of quality check to be performed.

"Contents of quality check to be performed (evaluation items in QC)" may be manually selected from multiple evaluation items by the user, or may be automatically selected by the controller 21 on the basis of information input by the user (e.g., frame number of a target frame image F, dose value in imaging, and usage of the phantom 5/6), or may be determined beforehand (by default).

For example, the controller 21 obtains image data of any one of the following: a QC image obtained by dynamic imaging of the phantom 5, a QC image obtained by dynamic imaging of a phantom that includes an evaluation member corresponding to the contents of the quality check to be performed, a QC image obtained by dynamic imaging of the dynamic phantom 6, or a solid image obtained by dynamic imaging without the subject S.

As described above, the phantom 5 in this embodiment includes multiple kinds of evaluation members. Therefore, a QC image obtained by dynamically imaging the phantom 5 is usable for multiple kinds of quality checks.

In the obtainment step in this embodiment, the controller 21 receives image data through the communication unit 23.

In the obtainment step, the controller 21 may retrieve the image data from the storage 22 or other media.

In the obtainment step, the controller 21 may obtain the image data of medical images obtained by dynamically imaging an actual examinee as the subject S.

The controller 2 does not need to perform the obtainment step in the dynamic imaging QC process in a case where the controller 2 starts the dynamic imaging QC process in response to obtaining the image data.

(Generation of Dynamic Imaging Quality Information)

After obtaining the image data, the controller 21 performs a generation step (Step S2 in FIG. 5 and FIG. 6).

In the generation step, the controller 21 uses at least two frame images to generate information regarding quality of dynamic imaging (hereinafter, quality information). The at least two frame images are among multiple frame images constituting a dynamic image obtained by dynamic imaging, and include a first frame image and a second frame image The quality information includes at least one of the following: information indicating linearity of the dynamic image; evenness of the dynamic image; and temporal stability of pixel values of the dynamic image.

The quality information in this embodiment further includes at least one of the following: information indicating temporal change of streaks in the dynamic image; information indicating presence or absence of image lag; information indicating the frame rate; information indicating accuracy of the exposure index (EI); and information indicating linearity of the EI.

The quality information may further include at least one of the following: information indicating low contrast resolution of the dynamic image; information indicating streaks; information indicating unevenness; information indicating at least either a ROIC block unevenness or pixel value differences; information indicating presence or absence of motion artifacts; and information indicating fall response of the radiation X.

The quality information is output in the form of at least one of the following: a value(s) indicating the quality, an image(s) showing the quality, and the result of evaluating the quality (e.g., PASS or FAIL).

In the generation step of this embodiment (hereinafter, first case), the controller 21 firstly determines a target frame image of quality control (hereinafter called target frame image F). The target frame image F is used to generate the quality information (Step S21 in FIG. 5).

Specifically, the controller 21 receives selection of a specific frame image(s) from the user through the operation receiver 25. The controller 21 then determines the target frame image F from among multiple frame images on the basis of the selection received through the operation receiver 25.

In the other case (hereinafter, second case) of the generation step in this embodiment, the controller 21 selects a target frame image F as a target of QC from among frame images constituting the dynamic image on the basis of the evaluation item(s) in QC, and generates the quality information of the dynamic imaging using the selected target frame image F.

The evaluation items in QC include at least one of the following: low contrast resolution of the dynamic image; presence or absence of streaks; presence or absence of evenness; presence or absence of at least either ROIC block unevenness or pixel value differences at the boundaries of sensor substrates; presence of absence of motion artifacts; and fall response of the radiation X.

The evaluation items in QC of this embodiment further include at least one of the following: linearity of the dynamic image; evenness of the dynamic image; temporal stability of pixel values in the dynamic image; temporal change of streaks in the dynamic image; presence or absence of image lag; frame rate; accuracy of the EI; and linearity of the EI.

Specifically, the controller 21 selects one target frame image F or at least two target frame images F on the basis of the evaluation item in QC that has been set (Step 21 in FIG. 6).

For example, assume that the set evaluation item in QC is at least one of the low contrast resolution of the dynamic image, presence of streaks, presence of unevenness, presence of at least either ROIC block unevenness or pixel value differences, presence of motion artifacts, and fall response of the radiation X. In the case, the controller 21 selects one target frame image F from among multiple frame images.

For another example, assume that the set evaluation item in QC is at least one of the linearity of the dynamic image, evenness of the dynamic image, temporal stability of pixel values in the dynamic image, temporal change of streaks in the dynamic image, presence or absence of image lag, frame rate, accuracy of the EI, and the linearity of the EI. In the case, the controller 21 selects at least two target frame images F from among multiple frame images.

As a common example for the above two cases, assume that the user selects, as a specific frame image, at lease either the first frame image or the last frame image. In the case, the controller 21 may determine one target frame image F or at least two target frame images F from among frame images except the specific frame image. For example, the target frame image(s) F may be: the frame images excluding at least the first frame image; frame images excluding at least the last frame image; or frame images excluding at least the first and last frame images.

Assume that the user selects a middle frame image (e.g., image with a serial number closest to the median) as the specific frame image. In the case, the controller 21 may determine, as the target frame image(s) F, one frame image or at least two frame images including the selected specific frame image. For example, the target frame image(s) F may be: the middle frame image and several images immediately before and after the middle frame image; or the middle frame image and several frame images thereafter (e.g., including frame images from the middle to the last).

Assume that the user selects the former half of the entire frame images as the specific frame images. In the case, the controller 21 may determine the first 30% of the entire specific frame images as the target frame images F.

For the temporal stability of doses, all the frames may be evaluated.

The frame images used in generating the quality information are thus narrowed. This can shorten the time required for the subsequent process and reduce image data size.

The radiation X, which is generated by the generation device 3, becomes stable in the latter half of dynamic imaging. By setting the frame images from the middle to the end as the target frame images F, the controller 21 can stably perform operation for generating the quality information.

In the generation step, the controller 21 may determine, as the target frame image F, a frame image that meets a certain criterion from among multiple frame images. The controller 21 may select one target frame image F from among frame images meeting a specific criterion.

Specifically, the controller 21 may determine the target frame image(s) F from among frame images taken with a dose equal to or lower than a specific dose (especially the frame image taken with the lowest dose). This is because the images taken with lower doses conspicuously show the level of contrast resolution, streaks, and ROIC block unevenness. The controller 21 may select one target frame image F from among frame images taken with doses equal to or lower than a specific dose.

When the specific criterion specifies that the first frame image is not used, the controller 21 may determine the first 10% to 30% of frame images except the first frame image as the target frame images F.

In the generation step, the controller 21 may not receive selection of the specific frame image by the user, as necessary.

In evaluating the temporal stability of doses as an evaluation item in QC, the controller 21 may select all the frame images constituting the dynamic image as the target frame images F.

In selecting at least two frame images in the generation step in this embodiment, the controller 21 may determine, as the target frame images F, frame images extracted at intervals of several frames.

In the generation step in this embodiment, the controller 21 may determine the number (n) of target frame images F before selecting the target frame image(s) F.

Specifically, in a case where at least two target frame images F are selected, the controller 21 may determine the number (n) of target frame images F such that the total of doses required for obtaining the respective/individual frame images (n times of a dose per frame image) reaches the dose required for obtaining one still image. The controller 21 may then use the target frame images F of the determined number (n) to generate the quality information.

"The dose required for obtaining the frame images" may be an actual measured value or a set value.

The actual measured value may be a dose generated by the generation device 3 or the dose of radiation that arrives the panel.

The set value may be a standard dose determined beforehand. For example, the set value may be determined on the basis of the irradiation conditions that are stored in the storage 22 beforehand and set to the generation device 3.

The controller 21 may determine the target frame image(s) F automatically or according to the manipulation of the operation receiver 25 by the user.

In the generation step of this embodiment, the controller 21 sets a partial region R together with or before/after determination of the target frame image F (Step 22).

When the image data obtained in the obtainment step is a QC image obtained by dynamic imaging of the phantom 5, the controller 21 sets, as the partial region R, the region in the QC image showing the evaluation member corresponding to the quality check to be performed.

For example, in checking low contrast resolution, the controller 21 sets the region of the metal discs 52*a* to 52*c* in the QC image as the partial region R.

Further, in checking linearity or evenness, the controller 21 sets the region showing the step wedge 54 in the QC image as the partial region R.

Further, in checking sharpness, the controller 21 sets the region showing the edge pattern 53 in the QC image as the partial region R.

When the image data obtained in the obtainment step is a QC image obtained by dynamic imaging of the dynamic phantom 6 (i.e., when the frame rate is to be checked), the controller 21 sets the region of the movable part 62 in the QC image as the partial region R.

The controller 21 may set the partial region R automatically or according to the manipulation of the operation receiver 25 by the user.

When medical images are obtained in the obtainment step, the controller 21 may set, as the partial region R, the region to which a doctor pays attention (i.e., region of interest (ROI) that is required to have a certain level image quality) or the factors affecting the image quality (e.g., ROIC blocks).

the partial region R does not need to be set in a case where the QC image obtained in the obtainment step shows only one evaluation member in its whole frame images or a case where a solid image is obtained in the obtainment step and the controller 21 has sufficient processing power (i.e., the controller 21 can perform arithmetic processing targeting all the pixels of every frame).

In the dynamic imaging QC process in this embodiment (first case), the controller 21 sets the partial region R and then generates the quality information on the basis of statistical information related to at least two target frame images F among multiple frame images (Step S23 in FIG. 5).

In the dynamic imaging QC process in the other case (second case), when the controller 21 selects one frame image, the controller 21 sets the partial region R and then generates quality information using the selected one target frame image F, which may include noise in its pixel values (Step 23 in FIG. 6).

In the dynamic imaging QC process in the other case (second case), when the controller selects at least two frame images, the controller 21 sets the partial region R and then generates quality information using the selected at least two frame images among multiple frame images constituting the dynamic image, the at least two frame images including a first frame image and a second frame image (Step S23 in FIG. 6). The controller 21 generates the quality information on the basis of statistical information related to the selected at least two target frame images F.

The statistical information to be used in the generation step of this embodiment is average information.

The average information is the information obtained by averaging pieces of information related to the at least two target frame images F.

The statistical information may be regarding addition (addition information), multiplication (multiplication information), subtraction (subtraction information), division (division information), or dispersion (dispersion information).

The addition information is information obtained by adding up pieces of information regarding the at least two target frame images F among multiple target frame images F.

The multiplication information is information obtained by multiplying (i) a piece of information regarding a target frame image F among at least two target frame images F and (ii) a piece of information regarding at least one of the remaining target frame images F.

The subtraction information is information obtained by subtracting, from a piece of information regarding a target frame image F of at least target frame images F, a piece of information regarding at least one of the remaining target frame images F.

The division information is information obtained by dividing (i) information regarding one of at least two target frame images F by (ii) information regarding at least one of the remaining target frame images F. The division information may be a ratio between pieces of information.

The dispersion information is information on the dispersion of pieces of information regarding at least two target frame images F.

The statistical information may be a combination of any of these pieces of information. For example, the statistical information may be a value obtained by the following expression: (pixel value of second frame image−pixel value of first frame image)/pixel value of first frame image. Such statistical information indicates information regarding temporal change of each piece of information regarding the target frame images F.

In the dynamic imaging QC process in this embodiment, the controller 21 sets the partial region R beforehand. Therefore, in the generation step in this embodiment, the controller 21 generates the quality information on the basis of the partial region R in the first frame image and the region in the second frame image that corresponds to the partial region R.

[Linearity of Pixel Values]

For example, assume that information indicating linearity of pixel values read by the detector 1 is generated as the quality information. Specifically, assume that a QC image is obtained in the obtainment step and the region showing the step wedge 54 in the obtained QC image is set as the partial region R. In the case, the controller 21 calculates average information (average values) on the average of pixel values of corresponding regions among at least two target frame images F, as shown in FIG. 7A. The average information is the average of pixel values of the partial region R in one target frame image F and pixel values of the region(s) in the other target frame image(s) F corresponding to the partial region R (region(s) at the same coordinates as the partial region R). Thus, noise in the pixel values of the region showing the step wedge 54 is reduced.

On the basis of the calculated average information, the controller 21 calculates values indicating linearity between radiation doses that pass through the respective metal plates 54a to 54d of the step wedge 54 and pixel values of the regions showing the respective metal plates 54a to 54d.

The controller 21 may also generate an image corresponding to the calculated values and determine whether the calculated values indicate sufficient linearity, as necessary.

When the partial region R has a certain size (the number of pixels constituting the partial region R is great to some extent), the controller 21 may not calculate the statistical information based on pieces of information of multiple frame images. Instead, the controller 21 may calculate the average value of pixels constituting the partial region R in one target frame image F to reduce noise.

When the phantom 5 is not used, the controller 21 may obtain multiple solid images (solid dynamic images) through dynamic imaging with different doses of radiation generated by the generation device 3, instead of frame images showing the phantom 5.

The controller 21 may then generate information indicating linearity between the dose in obtaining each solid image (solid dynamic image) and the pixel values of the solid image. In the case, the controller 21 generates the quality information using at least two frame images but does not use the statistical information.

In generating the information indicating the linearity, the controller 21 may extract one frame image from each solid image and use the pixel values of the extracted one frame image. Alternatively, the controller 21 may calculate the average of pixel values of frame images in each solid image (solid dynamic image) and use the calculated value.

[Evenness of Pixel Values]

Assume that information indicating evenness of pixel values read by the detector 1 is generated as the quality information. Specifically, assume that a QC image is obtained in the obtainment step and the region showing the edge pattern 53 in the obtained QC image is set as the partial region R. In the case, the controller 21 calculates average information (average values) on the average of pixel values of corresponding regions among at least two target frame images F, as shown in FIG. 7B. The average information is the average of pixel values of the partial region R in one target frame image F and pixel values of regions corresponding to the partial region R in the other target frame image(s) F (regions at the same coordinates as the partial region R). Thus, noise in the pixel values of the region showing the edge pattern 53 is reduced.

On the basis of the calculated average information, the controller 21 calculates a value(s) indicating variations of pixel values of pixels constituting the region showing the edge pattern 53.

The controller 21 may also generate an image corresponding to the calculated value and determine whether the calculated value indicates sufficient evenness, as necessary.

The controller 21 may generate information indicating noise in the pixel values constituting the partial region R or evenness of the ratio between signals and noise (S/N).

In generating the information indicating noise or evenness of S/N, the controller 21 may calculate values indicating noise or values indicating dispersion of S/N, and then average the calculated values. In the case, the controller 21 generates the quality information using at least two frame images but does not use the statistical information.

[Temporal Stability of Pixel Values]

Assume that information indicating temporal stability of pixel values read by the detector 1 is generated as the quality information. Specifically, assume that an unexposed image is obtained in the obtainment step. In the case, the controller 21 generates the information indicating temporal stability of pixel values on the basis of: a pixel value of the partial region R in one frame image among at least two frame images; and a pixel value(s) of the corresponding region(s) (region(s) at the same coordinates as the partial region R) in the other frame image(s) among at least two frame images.

The pixel value of the partial region R/corresponding region may be one pixel value in the region or may be the representative value among multiple values of pixels in the region (e.g., average or median).

The controller 21 then calculates a value indicating dispersion of the obtained pixel values.

The controller 21 may also generate an image corresponding to the calculated value and determine whether the calculated value indicates sufficient evenness, as necessary.

In the case, the controller 21 generates the quality information using at least two frame images but does not use the statistical information.

[Temporal Change of Streaks]

Assume that information indicating temporal change of streaks in a dynamic image, which is generated by the detector 1, is generated as the quality information. Specifically, assume that an unexposed image is obtained in the obtainment step and, in the obtained unexposed image, the elongated region extending along the direction of the streaks (lateral direction) is set as the partial region R. In the case, the controller 21 calculates, for each of the frame images, the average of pixel values constituting the partial region R.

The controller 21 then analyzes changes of the calculated average values.

For example, the controller 21 calculates a value indicating dispersion of the obtained pixel values.

The controller 21 may also generate an image corresponding to the analysis result and determine whether the analysis result indicates sufficiently small streaks or a sufficiently small number of streaks, as necessary.

In the case, the controller 21 generates the quality information using at least two frame images but does not use the statistical information.

The controller 21 may perform the above determination several times by changing the position of the partial region R and determine the analysis result containing the largest change as the quality information.

The quality information may be information indicating presence or absence of streaks in one frame image. In the case, the controller 21 obtains the pixel value profile in the direction orthogonal to the direction in which the streak extends in one frame image. The controller 21 then performs frequency analysis, amplitude analysis, standard deviation (SD) analysis, or other techniques to determine whether the pixel values change.

In the case, the controller 21 may average the analysis result of the pixel value profile among frame images. That is, the controller 21 generates the quality information using at least two frame images but does not use the statistical information.

The controller 21 can also detect the presence of electromagnetic noise or streaks caused by disturbance by using the same technique for detecting the temporal change of streaks and the presence of streaks.

[Presence of Image Lag]

Assume that information indicating the presence of image lag is generated as the quality information. In the case, by using one frame image and another frame image immediately before the one frame image, the controller 21 identifies the region in the one frame image that is at the same coordinates as the region in the other frame image showing the movable part of the dynamic phantom 6. The controller 21 then calculates the ratio between the pixel values constituting the identified region and pixel values around the identified region.

The controller 21 may also generate an image corresponding to the calculated ratio and determine whether the calculated ratio sufficiently indicates the presence of image lag, as necessary.

That is, the controller 21 generates the quality information using at least two frame images but does not use the statistical information.

[Frame Rate]

Assume that at least either of the following is generated as the quality information: information indicating the number of times the detector 1 repeats accumulating and discharging electric charges and reading pixel values per unit time (reading frame rate); and information indicating the number of times the generation device 3 repeats emission of the radiation X per unit time (irradiation frame rate). Specifically, assume that a QC image of the dynamic phantom 6 is obtained in the obtainment step and, in the obtained QC image, the region showing the movable mart of the phantom is set as the partial region R. In the case, the controller 21 calculates at least either the reading frame rate or the irradiation frame rate, on the basis of the difference in positions of the region showing the movable part between one target frame image F and the next target frame image F. The difference may be based on the angle by which the movable part rotates in a cycle of generating one frame. In the case, the controller 21 generates the quality information using at least two frame images but does not use the statistical information.

On the basis of the difference in positions of the region showing the movable part, the controller 21 may calculate at least either of the following: information indicating a time between the start of accumulation/discharge of electric charges or reading of pixel values by the detector 1 and the next start of the same operation by the detector 1 (i.e., reading interval); and information indicating a time between the start of emission of the radiation X by the generation device 3 and the next start of the same operation by the generation device 3 (irradiation interval).

[Temporal Stability of Doses]

Assume that information indicating temporal stability of doses of the radiation X, which is generated by the generation device 3, is generated as the quality information. Specifically, assume that, in a QC image, the region showing the edge pattern 53 is set as the partial region R. In the case, the controller 21 calculates, for each of the frame images, the average of pixel values constituting the partial region R (the pixel values correspond to the doses arrived at the respective radiation detecting elements), and then calculates the value indicating dispersion of the calculated average values.

The controller 21 may also generate an image corresponding to the calculated value and determine whether the calculated value indicates sufficient temporal stability, as necessary.

That is, the controller 21 generates the quality information using at least two frame images but does not use the statistical information.

The controller 21 may remove the effect of temporal stability of pixel values from the temporal stability of doses. Specifically, the controller 21 may obtain multiple frame images each of which contains exposed and unexposed regions. Such frame images can be obtained by narrowing the irradiation field, for example. The controller 21 may then calculate (i) temporal change of pixel values using the unexposed regions in the frame images and (ii) temporal change of doses using the exposed regions. The controller 21 may then remove the calculated temporal change of pixel values.

[Accuracy of EI]

Assume that information indicating accuracy of EI is generated as the quality information. Specifically, assume that multiple solid images (solid dynamic images) are obtained through dynamic imaging with different doses generated by the generation device 3. In the case, the controller 21 calculates an exposure index (EI) on the basis of the dose in each imaging and pixel values of the solid image corresponding to the dose.

The controller 21 may also generate an image corresponding to the calculated EI and determine whether the calculated EI indicates sufficient accuracy, as necessary.

Assuming that the calculation of accuracy of for the respective doses as one analysis, the controller 21 generates the quality information using at least two frame images but does not use statistical information.

[Linearity of EI]

Assume that information indicating linearity of EI is generated as the quality information. Specifically, assume that multiple solid images (solid dynamic images) are obtained through dynamic imaging with different doses generated by the generation device 3. In the case, the controller 21 calculates an EI on the basis of the dose in each imaging and pixel values of the solid image corresponding to the dose.

The controller 21 then calculates a value indicating linearity between the dose in each imaging and the calculated EI in the imaging.

The controller 21 may also generate an image corresponding to the calculated values and determine whether the calculated values indicate sufficient linearity, as necessary.

Assuming that the calculation of accuracy of for the respective doses as one analysis, the controller 21 generates the quality information using at least two frame images but does not use statistical information.

Hereinafter, examples of the quality information in the second case are described.

[Low Contrast Resolution]

For example, assume that information indicating low contrast resolution is generated as the quality information. Specifically, assume that a QC image is obtained in the obtainment step and, in the target frame image F of the obtained QC image, the region of the metal discs 52a to 52c is set as the partial region R. In the case, the controller 21 calculates the contrast ratio of the partial region R set in one target frame image F, as exemplified in FIG. 8.

The controller 21 may also generate an image corresponding to the calculated contrast ratio or determine whether the calculated contrast ratio indicates a sufficient level of low contrast resolution, as necessary.

In the case, the controller 21 may average the contrast ratio among frame images. That is, the controller 21 generates the quality information using at least two frame images.

[Presence of Streaks]

Assume that information indicating presence or absence of a streak in one frame image is generated as the quality information. In the case, the controller 21 obtains the pixel value profile in the direction orthogonal to the direction in which the streak extends. The controller 21 then performs frequency analysis, amplitude analysis, standard deviation (SD) analysis, or other methods to determine whether the pixel values change.

In the case, the controller 21 may average the analysis result of the pixel value profile among frame images. That is, the controller 21 generates the quality information using at least two frame images.

The controller 21 can also detect the presence of electromagnetic noise or streaks caused by disturbance by using the same technique for detecting the presence of streaks.

[Presence of ROIC Block Unevenness/Pixel Value Differences]

One sensor substrate of the detector 1 may include multiple ROICs that read signal values of different rows. With such a detector 1, pixel values may different between rows (ROIC block unevenness) owing to different characteristics between the ROICs.

The detector 1 may also include multiple sensor substrates. As the multiple sensor substrates have their respective ROICs, pixel values may differ at the boundaries of the sensor substrates (pixel value differences).

Assume that information indicating the presence of at least either the ROIC block unevenness or pixel value differences is generated as the quality information. Specifically, assume that an unexposed image (frame image generated after a certain time elapses since the start of obtaining a dark image for offset correction, namely a frame image that conspicuously shows ROIC block unevenness) is obtained in the obtainment step. In the case, for example, the controller 21 obtains the pixel value profile of the target frame image F in the direction orthogonal to the direction of signal lines of the sensor substrate connected to the ROIC.

From the obtained pixel value profile, ROIC block unevenness is detected.

Pixel value differences can also be detected by using the same technique for detecting the ROIC block unevenness.

[Presence of Motion Artifacts]

Frame images of a dynamic image affected by motion artifacts show a deformed shape of the subject S. For example, when the subject S is the dynamic phantom 6, the round movable part 62 is shown as an oval shape in the images.

Assume that information indicating the presence of motion artifacts is generated as the quality information. In the case, the controller 21 measures/calculates values indicating the shape of the movable part 62 of the dynamic phantom 6 (e.g., longitudinal and lateral diameters or the ratio between these diameters).

The controller 21 may also generate an image corresponding to the measured value and determine whether the measured value indicates image deformation, as necessary.

[Presence of Image Lag]

Assume that information indicating the presence of image lag is generated as the quality information. In the case, the controller 21 identifies, in one frame image, the region that is at the same coordinates as the region showing the movable part 62 of the dynamic phantom 6 in the frame image immediately before the one frame image, on the basis of the movable part 62 shown in the one frame image, motion speed of the dynamic phantom 6, and frame rate, for example. The controller 21 then calculates the ratio between the pixel values constituting the identified region and pixel values around the identified region.

The controller 21 may also generate an image corresponding to the calculated ratio and determine whether the calculated ratio indicates presence of image lag, as necessary.

[Fall Response of Radiation]

When the radiation X falls slowly (i.e., radiation shows large/high wave tail), the pixel value profile in the signal line direction of the first frame image shows uneven densities.

Assume that information indicating the fall response of radiation X is generated as the quality information (the first frame image is obtained in the obtainment step). In the case, the controller 21 obtains the pixel value profile of the target frame image F.

The controller 21 then determines whether the pixel value profile in the signal line direction shows density unevenness.

When the quality information generated in the generation step of the above-described two cases indicates that a required quality level is not met, the controller 21 may generate at least either a check item(s) regarding the quality information indicating that a required quality level is not met or the reason why such quality information was generated.

To generate the check item, the controller 21 may refer to a table that is stored in the storage 22 beforehand and that shows the correlation between pieces of quality information indicating that a required quality level is not met and check items (possible factors). Alternatively, a machine learning model may be prepared that has learned pieces of quality information as inputs and check items as outputs, and the generated quality information indicating that the required quality level is not met may be input to the machine learning model.

Before starting the generation step or at the start of the generation step, the controller 21 may determine whether the dose required for obtaining one frame image is less than a predetermined dose (e.g., dose required for obtaining one still image). When determining that the dose is less than the predetermined dose, the controller 21 may generate the quality information. When determining that the dose is equal to or greater than the predetermined dose, the controller 21 may not perform the subsequent process. Specifically, the controller 21 may perform the above determination in a case where at least two frame images are selected as the target frame images F on the basis of the evaluation item of QC.

The controller 21 in this embodiment serves as a generation unit that performs the above-described generation step.

The generation step performed by the controller 21 corresponds to generating the quality information regarding the quality of dynamic imaging in the dynamic imaging QC method.

[Output of Dynamic Imaging Quality Information]

After generating the quality information, the controller 21 performs an output step (Step S3).

In the output step, the controller 21 outputs the generated quality information.

In the output step of this embodiment, the controller 21 displays the quality information (e.g., values, images, determination results) on the display 24.

In the output step, the controller 21 may send the quality information to another device (e.g., the console 4, a terminal device, a printer) so that the other device displays/prints out the quality information.

When the QC device 2 includes a unit for writing information on a recording medium, the controller 21 may write the quality information on the recording medium in the output step.

In the output step, the controller 21 may output the quality information generated in the past generation step, which was performed before the most recent generation step.

In the case, the controller 21 may output the most recent quality information and the past quality information together (e.g., as a graph).

This makes it possible to easily check whether the state of the system 100 has changed between quality checks performed at different timings.

In the output step, the controller 21 may output an alert when determining that the quality has decreased by a certain level or more on the basis of the comparison between the past quality information and the most recent quality information.

Assume that (i) the controller 21 generates the quality information indicating that a required quality level is not met in the generation step and (ii) the controller 21 generates at least either a check item regarding the quality information indicating that a required quality level is not met or the reason why such quality information was generated. In the case, the controller 21 may output at least either the check item or the reason in the output step.

Assume that all or part of the quality information generated in the generation step indicates that the required quality level is met. In the case, in the output step, the controller 21 may output information that dynamic imaging is available.

Thus, the controller 21 can prevent the user from performing dynamic imaging when at least part of the system 100 has a problem.

The controller 21 in this embodiment serves as an output unit that performs the above-described output step.

The output step performed by the controller 21 corresponds to outputting the quality information regarding the quality of dynamic imaging in the dynamic imaging QC method.

3. Advantageous Effects

As described above, the QC device 2 or the system 100 including the QC device 2 according to this embodiment performs quality control of dynamic imaging, in which a dynamic state of the subject S is imaged by irradiating the subject S with the radiation X. The QC device 2/system 100 includes the controller 21 (hardware processor, generation unit, output unit) that generates quality information by using at least two frame images among multiple frame images constituting a dynamic image obtained by the dynamic imaging and outputs the quality information.

Such a QC device 2/system 100 can appropriately perform quality control of dynamic imaging, in which multiple frame images are obtained.

On the basis of the evaluation item of QC, the QC device 2/system 100 selects the target frame image(s) F, which is the target of QC, from among multiple frame images constituting a dynamic image obtained by dynamic imaging. The QC device 2/system 100 generates the quality information by using the selected frame image(s). In outputting The QC device 2/system 100 can output the quality information by appropriately performing QC of dynamic imaging for the respective evaluation items of QC.

4. Miscellaneous

Naturally, the above embodiment does not limit the present invention and can be appropriately modified without departing from the scope of the present invention.

For example, although the QC device 2 or the system 100 in the above embodiment performs only quality control of dynamic imaging, they may perform quality control of both still imaging and dynamic imaging.

Further, in the above embodiment, the QC device 2 performs the generation step and output step. However, when the system 100 includes a dynamic analysis device, the dynamic analysis device may perform the generation step, and the QC device 2 may perform the output step on the basis of the analysis result.

Further, in the above description, a hard disk and a semiconductor nonvolatile memory are disclosed as computer readable media for storing the program of the present invention. However, these examples do not limit the present invention. As other computer readable media, a portable storage medium, such as a CD-ROM, can be used. A carrier wave is also applicable as a medium for providing the program data of the present invention via a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. A dynamic imaging quality control device that performs quality control of dynamic imaging in which a dynamic state of a subject is imaged by irradiating the subject with radiation, the dynamic imaging quality control device comprising a hardware processor that
generates quality information regarding a quality of the dynamic imaging by using at least two frame images among multiple frame images constituting a dynamic image obtained by the dynamic imaging and
outputs the quality information;
wherein the quality control is performed at least at one of a time that the dynamic imaging quality control device is delivered or periodically after the dynamic imaging quality control device is delivered;
wherein the quality information includes at least either information indicating linearity of the dynamic image or information indicating evenness of the dynamic image;
wherein the dynamic imaging quality control device calculates average values of pixel values of partial regions among at least the two target frame images; and
wherein at least either:
the dynamic imaging quality control device determines whether the calculated average values indicate sufficient linearity by comparing values indicating linearity between radiation doses that pass through the respective evaluation member, and pixel values of the regions showing the respective evaluation members; or
for different partial regions of the partial regions, the dynamic imaging quality control device determines whether the calculated average values indicate sufficient evenness based on the variations of the average values of pixels.

2. The dynamic imaging quality control device according to claim 1, wherein
the hardware processor generates the quality information, based on statistical information regarding the at least two frame images among the multiple frame images.

3. The dynamic imaging quality control device according to claim 2,
wherein the at least two frame images include a first frame image and a second frame image,
wherein the hardware processor generates the quality information, based on a partial region in the first frame image and a region in the second frame image that corresponds to the partial region.

4. The dynamic imaging quality control device according to claim 2,
wherein the statistical information includes
addition information obtained by adding up pieces of information regarding the at least two frame images among the multiple frame images,
multiplication information obtained by multiplying a piece of information by another piece of information, the piece of information and the other piece of information being among the pieces of information,
subtraction information obtained by subtracting a piece of information from another piece of information, the piece of information and the other piece of information being among the pieces of information,
division information obtained by dividing a piece of information by another piece of information, the piece of information and the other piece of information being among the pieces of information,
average information obtained by averaging the pieces of information, or
dispersion information on dispersion of the pieces of information.

5. The dynamic imaging quality control device according to claim 1, wherein
the quality information includes information on temporal stability of pixel values of the dynamic image.

6. The dynamic imaging quality control device according to claim 1, wherein
the hardware processor determines a number of the at least two frame images such that a total of doses required for obtaining the respective at least two frame images reach a dose required for obtaining one still image,
wherein the hardware processor generates the quality information by using the at least two frame images of the determined number.

7. The dynamic imaging quality control device according to claim 1,
wherein the hardware processor generates the quality information when a dose required for obtaining one frame image is less than a predetermined value.

8. The dynamic imaging quality control device according to claim 1,
wherein the hardware processor determines a target frame image as a target of quality control from among the multiple frame images.

9. A non-transitory computer-readable storage medium storing a dynamic imaging quality control program for performing quality control of dynamic imaging in which a dynamic state of a subject is imaged by irradiating the subject with radiation, the program causing a computer to:
generate quality information regarding a quality of the dynamic imaging by using at least two frame images among multiple frame images constituting a dynamic image obtained by the dynamic imaging, and
output the quality information;
wherein the quality control is performed at least at one of a time that the dynamic imaging quality control device is delivered or periodically after the dynamic imaging quality control device is delivered;
wherein the quality information includes at least either information indicating linearity of the dynamic image or information indicating evenness of the dynamic image;
wherein the dynamic imaging quality control device calculates average values of pixel values of partial regions among at least the two target frame images; and
wherein at least either:
the dynamic imaging quality control device determines whether the calculated average values indicate sufficient linearity by comparing values indicating linearity between radiation doses that pass through the respective evaluation members, and pixel values of the regions showing the respective evaluation members; or
for different partial regions of the partial regions, the dynamic imaging quality control device determines whether the calculated average values indicate sufficient evenness based on the variations of the average values of pixels.

10. The non-transitory computer-readable storage medium according to claim 9, wherein the quality information includes at least either information indicating linearity of the dynamic image or information indicating evenness of the dynamic image.

11. The non-transitory computer-readable storage medium according to claim 9, wherein the program causes the computer to generate the quality information, based on statistical information regarding the at least two frame images among the multiple frame images.

12. The non-transitory computer-readable storage medium according to claim 11, wherein
the at least two frame images include a first frame image and a second frame image,
wherein the program causes the computer to generate the quality information, based on a partial region in the first frame image and a region in the second frame image that corresponds to the partial region.

13. The non-transitory computer-readable storage medium according to claim 11, wherein the statistical information includes:
addition information obtained by adding up pieces of information regarding the at least two frame images among the multiple frame images,
multiplication information obtained by multiplying a piece of information by another piece of information, the piece of information and the other piece of information being among the pieces of information,
subtraction information obtained by subtracting a piece of information from another piece of information, the piece of information and the other piece of information being among the pieces of information,
division information obtained by dividing a piece of information by another piece of information, the piece of information and the other piece of information being among the pieces of information,
average information obtained by averaging the pieces of information, or
dispersion information on dispersion of the pieces of information.

14. The non-transitory computer-readable storage medium according to claim 9, wherein the quality information includes information on temporal stability of pixel values of the dynamic image.

15. The non-transitory computer-readable storage medium according to claim 9, wherein
the program causes the computer to determine a number of the at least two frame images such that a total of doses required for obtaining the respective at least two frame images reach a dose required for obtaining one still image,
wherein the program causes the computer to generate the quality information by using the at least two frame images of the determined number.

16. The non-transitory computer-readable storage medium according to claim 9, wherein
the program causes the computer to generate the quality information when a dose required for obtaining one frame image is less than a predetermined value.

17. The non-transitory computer-readable storage medium according to claim 9, wherein
the program causes the computer to determine a target frame image as a target of quality control from among the multiple frame images.

18. A dynamic imaging quality control method for performing quality control of dynamic imaging in which a dynamic state of a subject is imaged by irradiating the subject with radiation, the method comprising:
generating quality information regarding a quality of the dynamic imaging by using at least two frame images among multiple frame images constituting a dynamic image obtained by the dynamic imaging, and
outputting the quality information;
wherein the quality control is performed at least at one of a time that the dynamic imaging quality control device is delivered or periodically after the dynamic imaging quality control device is delivered;
wherein the quality information includes at least either information indicating linearity of the dynamic image or information indicating evenness of the dynamic image;
wherein the dynamic imaging quality control device calculates average values of pixel values of partial regions among at least the two target frame images; and
wherein at least either:
the dynamic imaging quality control device determines whether the calculated average values indicate sufficient linearity by comparing values indicating linearity between radiation doses that pass through the respective evaluation members, and pixel values of the regions showing the respective evaluation members; or
for different partial regions of the partial regions, the dynamic imaging quality control device determines whether the calculated average values indicate sufficient evenness based on the variations of the average values of pixels.

19. The method according to claim 18, wherein
the quality information includes at least either information indicating linearity of the dynamic image or information indicating evenness of the dynamic image.

20. The method according to claim 18, wherein
the generating generates the quality information, based on statistical information regarding the at least two frame images among the multiple frame images.

21. The method according to claim 20, wherein
the at least two frame images include a first frame image and a second frame image,
wherein the generating generates the quality information, based on a partial region in the first frame image and a region in the second frame image that corresponds to the partial region.

22. The method according to claim 20, wherein
the statistical information includes:
addition information obtained by adding up pieces of information regarding the at least two frame images among the multiple frame images,
multiplication information obtained by multiplying a piece of information by another piece of information, the piece of information and the other piece of information being among the pieces of information,
subtraction information obtained by subtracting a piece of information from another piece of information, the piece of information and the other piece of information being among the pieces of information,
division information obtained by dividing a piece of information by another piece of information, the piece of information and the other piece of information being among the pieces of information,
average information obtained by averaging the pieces of information, or
dispersion information on dispersion of the pieces of information.

23. The method according to claim 18, wherein the quality information includes information on temporal stability of pixel values in the dynamic image.

24. The method according to claim 18, wherein the generating includes determining a number of the at least two frame images such that a total of doses required for obtaining the respective at least two frame images reach a dose required for obtaining one still image,
wherein the generating of the quality information uses the at least two frame images of the determined number.

25. The method according to claim 18, wherein the generating generates the quality information when a dose required for obtaining one frame image is less than a predetermined value.

26. The method according to claim 18, wherein the generating includes determining a target frame image as a target of the quality control from among the multiple frame images.

* * * * *